United States Patent
Christy et al.

(10) Patent No.: US 12,118,486 B2
(45) Date of Patent: *Oct. 15, 2024

(54) MIXED-REALITY ASSISTED DIMENSIONALITY EXPANSION AND MANIPULATION ANALYTICS

(71) Applicant: Blue Yonder Group, Inc., Scottsdale, AZ (US)

(72) Inventors: Brenda Christy, Bangalore (IN); Mayank Tiwari, Hyderabad (IN); Tushar Shekhar, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,029

(22) Filed: Nov. 15, 2023

(65) Prior Publication Data
US 2024/0086807 A1 Mar. 14, 2024

Related U.S. Application Data

(63) Continuation of application No. 17/150,045, filed on Jan. 15, 2021, now Pat. No. 11,853,943.
(Continued)

(51) Int. Cl.
*G06Q 10/0631* (2023.01)
*G06F 3/04815* (2022.01)
(Continued)

(52) U.S. Cl.
CPC ... *G06Q 10/06315* (2013.01); *G06F 3/04815* (2013.01); *G06F 3/04845* (2013.01);
(Continued)

(58) Field of Classification Search
CPC .............. G06Q 10/06315; G06Q 10/08; G06F 3/04815; G06F 3/04845; G06T 19/006; G06T 2200/24
See application file for complete search history.

(56) References Cited

U.S. PATENT DOCUMENTS

| 8,868,486 B2 | 10/2014 | Tamayo |
| 9,384,594 B2 | 7/2016 | Maciocci et al. |

(Continued)

FOREIGN PATENT DOCUMENTS

| GB | 2553256 | 3/2018 |
| WO | 2019216941 | 11/2019 |

OTHER PUBLICATIONS

Singh, Kishan, "Data Cube and its Basic Functionality", https://www.linkedin.com/pulse/data-cube-its-basic-functionality-kishan-singh published as of May 24, 2018. (Year: 2018).

*Primary Examiner* — William A Beutel
(74) *Attorney, Agent, or Firm* — Spencer Fane LLP; Steven J. Laureanti

(57) ABSTRACT

A system and method are disclosed to generate one or more mixed-reality visualizations and objects to facilitate efficient interaction with large volumes of data. Embodiments include a computer comprising a processor and memory and a mixed-reality display device comprising a display and one or more sensors. Embodiments generate a mixed-reality object comprising a first cuboid, the first cuboid comprising one or more adjustable display dimensions corresponding to one or more key process indicators (KPIs) and one or more cubelets divided along at least one of the one or more adjustable display dimensions. Embodiments display the mixed-reality object on the display, and adjust at least one of the one or more adjustable display dimensions in response to receiving a first input to the one or more sensors. In response to a second input, embodiments transform the one or more cubelets of the first cuboid.

20 Claims, 8 Drawing Sheets

Related U.S. Application Data

(60) Provisional application No. 62/970,644, filed on Feb. 5, 2020.

(51) Int. Cl.
*G06F 3/04845* (2022.01)
*G06Q 10/08* (2023.01)
*G06T 19/00* (2011.01)

(52) U.S. Cl.
CPC ........... *G06Q 10/08* (2013.01); *G06T 19/006* (2013.01); *G06T 2200/24* (2013.01)

(56) References Cited

U.S. PATENT DOCUMENTS

| | | | |
|---|---|---|---|
| 11,853,943 B1* | 12/2023 | Christy | ............ G06Q 10/06315 |
| 2012/0249741 A1* | 10/2012 | Maciocci | .............. G06T 19/006 |
| | | | 348/51 |
| 2016/0217405 A1 | 7/2016 | Steinbach et al. | |

* cited by examiner

MIXED-REALITY ASSISTED DIMENSIONALITY EXPANSION AND MANIPULATION ANALYTICS

CROSS-REFERENCE TO RELATED APPLICATIONS

This application is a continuation of U.S. patent application Ser. No. 17/150,045, filed Jan. 15, 2021, entitled "Mixed-Reality Assisted Dimensionality Expansion and Manipulation Analytics," which claims the benefit under 35 U.S.C. § 119(e) to U.S. Provisional Application No. 62/970,644, filed Feb. 5, 2020, entitled "Mixed-Reality Assisted Dimensionality Expansion and Manipulation Analytics." U.S. patent application Ser. No. 17/150,045 and U.S. Provisional Application No. 62/970,644 are assigned to the assignee of the present application.

TECHNICAL FIELD

The present disclosure relates generally to supply chain planning and specifically to mixed-reality-based sensory feedback and graphical representation and manipulation of supply chain monitoring and analysis.

BACKGROUND

Existing database systems may display database data using one or more display programs, such as, for example, Microsoft Excel. However, interacting with vast sums of database data using existing interfaces may require significant time investment and the study of hundreds or thousands of individual cells of data to derive meaningful data interpretation or to detect data trends. Data display and visualization systems that require a high degree of training to learn to operate, or that demand time-consuming granular review in order to accomplish meaningful data analysis, are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
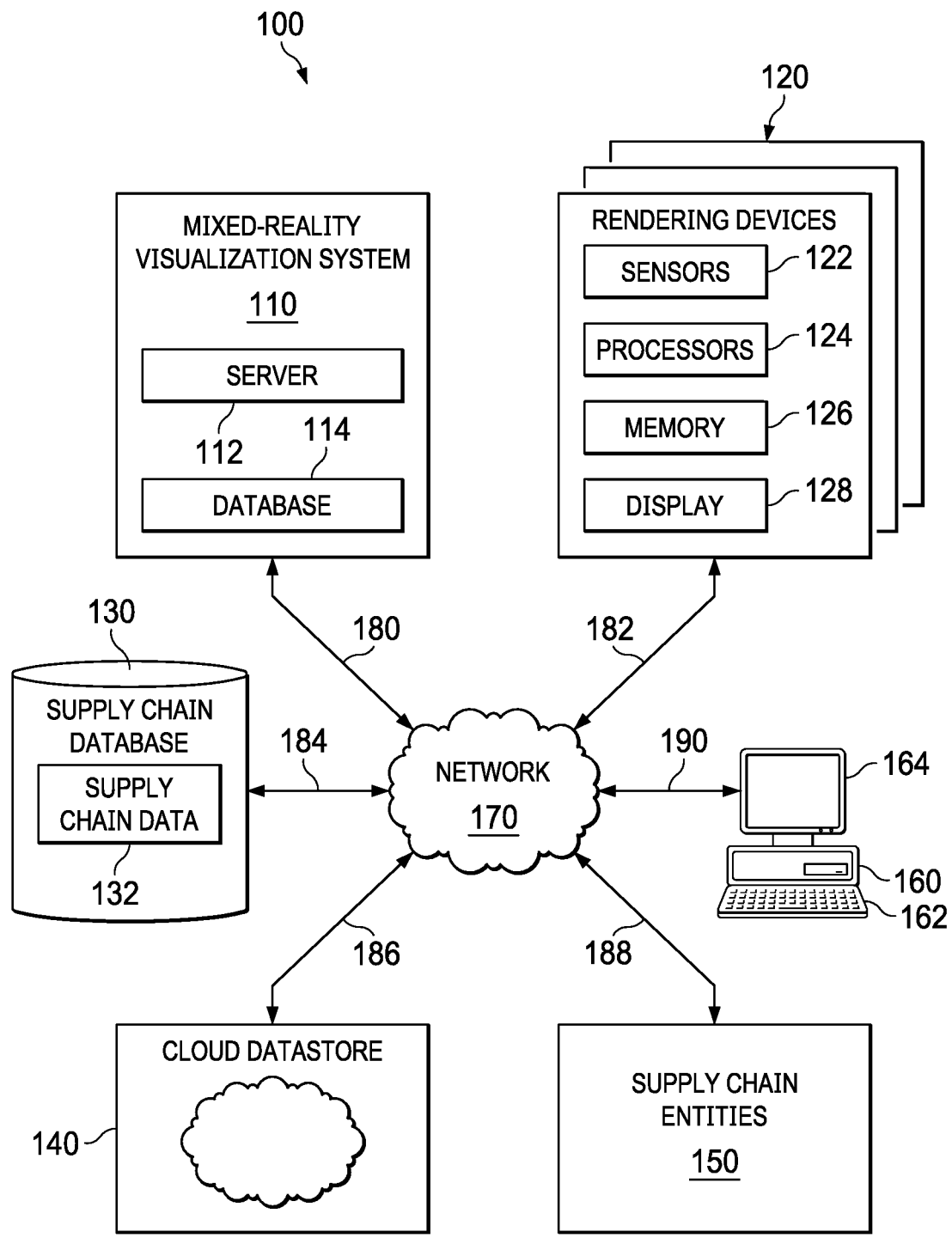
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in greater detail below, embodiments of the following disclosure provide a mixed-reality visualization system and method that generates and manipulates one or more mixed-reality cuboid visualizations. In an embodiment, the mixed-reality cuboid visualization may display database data comprising one or more selectable key process indicators (KPIs) according to one or more selectable dimensions (such as, for example, products sold, facilities at which products are sold, or time periods in which products are sold). The mixed-reality visualization system and method may comprise one or more rendering devices that display mixed-reality cuboid visualizations in virtual space, permitting the one or more rendering devices, and/or one or more computers, to interact with the mixed-reality cuboid visualizations and to rotate, expand, compress, slice, dice, stack, or otherwise alter the mixed-reality cuboid visualization and the data visualized by the mixed-reality cuboid visualization. In response to the interactions of one or more rendering devices and/or computers with the mixed-reality cuboid visualizations, the mixed-reality visualization system and method may access additional data stored in one or more databases, and may incorporate the additional data, and one or more additional KPIs and/or dimensions associated with the additional data, into the mixed-reality cuboid visualizations.

Embodiments of the following disclosure enable one or more rendering devices and/or one or more computers to interact with, manipulate, and call up large volumes of data swiftly and efficiently. Embodiments permit the visualization of data according to selectable KPIs and dimensions, and may represent patterns, trends, or other relationships using color-coded mixed-reality cuboid visualizations. The mixed-reality cuboid visualizations may assist in the identification of, and the taking action in response to, apparent or obscure patterns or trends in database data in a streamlined and efficient fashion.

FIG. 1 illustrates exemplary supply chain network 100, in accordance with a first embodiment. Supply chain network 100 comprises mixed-reality visualization system 110, one or more rendering devices 120, supply chain database 130, cloud datastore 140, one or more supply chain entities 150, computer 160, network 170, and communication links 180-190. Although single mixed-reality visualization system 110, one or more rendering devices 120, single supply chain database 130, single cloud datastore 140, one or more supply chain entities 150, single computer 160, and single network 170 are shown and described, embodiments contemplate any number of mixed-reality visualization systems 110, any number of rendering devices 120, any number of supply chain entities 150, any number of supply chain databases 130, any number of cloud datastores 140, any number of computers 160, or any number of networks 170, according to particular needs.

Mixed-reality visualization system 110 comprises server 112 and database 114. Server 112 of mixed-reality visualization system 110 comprises one or more modules that generate a mixed-reality environment having an interactive three-dimensional visualization for supply chain management (including but not limited to strategic planning and master planning), physicalization of supply chain planning problems, identifying and solving supply chain problems, viewing key process indicators (KPIs) and other supply chain metrics and parameters, and navigation of a global supply chain network. Embodiments of the following mixed-reality visualization system 110 interface with one or more rendering devices 120 to process, render, and display the mixed-reality environment and representations of supply chain network 100. According to further embodiments, mixed-reality visualization system 110 and one or more rendering devices 120 generate a visualization of, among other things, supply and demand, distribution networks 170, supply chain analytics, supply chain alerts, and KPIs, which may be conveyed to the user via one or more rendering devices 120 using visual and/or aural indicators. Mixed-reality visualization system 110 receives and processes data from one or more rendering devices 120, supply chain database 130, cloud datastore 140, and/or one or more supply chain entities 150 and stores the data in database 114.

Figure 2:
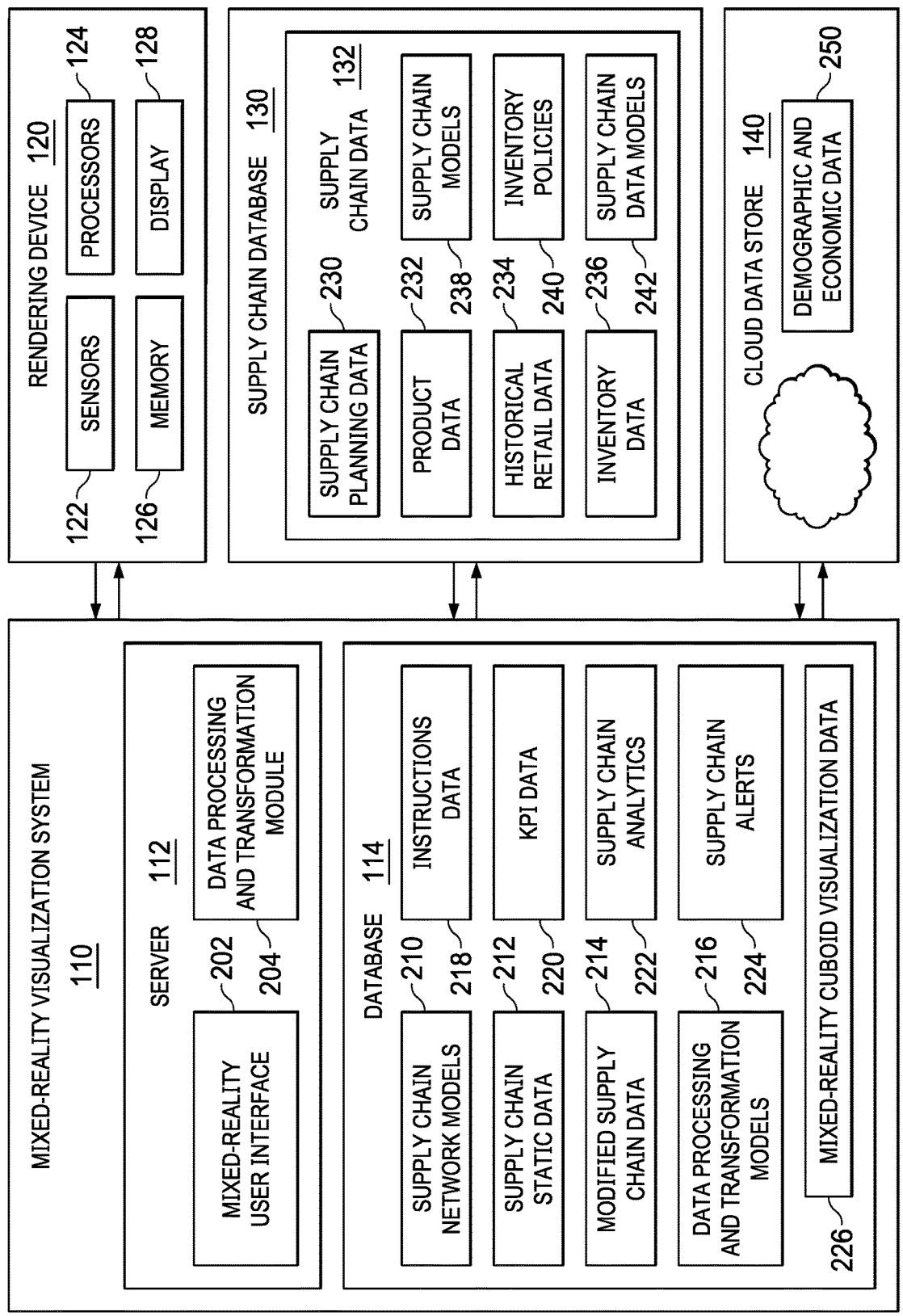
FIG. 2 illustrates the mixed-reality visualization system, one or more rendering devices, supply chain database, and cloud datastore of FIG. 1 in greater detail, in accordance with an embodiment.

According to embodiments, one or more rendering devices 120 comprise one or more electronic devices that display mixed-reality visualizations for navigating and interacting with supply chain network 100 and supply chain analytics 222 stored in mixed-reality visualization system 110 database 114 (illustrated by FIG. 2). One or more rendering devices 120 may comprise, for example, a mixed-reality headset, a head-mounted display, a smartphone, a tablet computer, a mobile device, a projector, or like devices. One or more rendering devices 120 comprise one or more sensors 122, one or more processors 124, memory 126, and display 128, and may include an input device, output device, and a fixed or removable computer-readable storage media. One or more sensors 122 may comprise an imaging sensor, such as, for example, a camera module, a light detection and ranging (LIDAR) device, radar device, infrared light sensor, ambient light sensor, or other electronic sensor. According to an embodiment, one or more sensors 122 detect the head movement, the field of vision, and the gaze of a user of one or more rendering devices 120. One or more processors 124 and associated memory 126 execute instructions and manipulate information according to the operation of mixed-reality visualization system 110 and any of the methods described herein. Display 128 of one or more rendering devices 120 displays visual information, such as, for example, feedback, analysis, data, images or graphics using mixed-reality visualizations. For example, display 128 may superimpose graphics, colors, text, or other renderings of supply chain data 132 over or in connection with a virtual visualization of a cuboid comprised of cubelets. Using one or more rendering devices 120, a user may interact with the rendered visualizations using speech, eye movement, and/or spoken instructions to interact with and modify supply chain network 100. Mixed-reality visualization system 110, in connection with one or more rendering devices 120, comprises a system to visualize supply chain processes and supply chain analytics 222 for improved real-time interaction. One or more rendering devices 120 may include fixed or removable computer-readable storage media, including a non-transitory computer readable medium, magnetic computer disks, flash drives, CD-ROM, in-memory devices or other suitable media to receive output from and provide input to mixed-reality visualization system 110.

Supply chain database 130 stores supply chain data 132 received from one or more supply chain entities 150. In one embodiment supply chain database 130 stores supply chain data 132 received from a manufacturing supply chain, such as, for example, data received from a demand planning system, inventory optimization system, supply planning system, order promising system, factory planning and sequencing system, and sales and operations planning system. In an embodiment in which supply chain network 100 comprises a retail supply chain, supply chain database 130 stores data received from one or more retail supply chain planning and execution systems such as, for example, historical sales data, retail transaction data, store characteristic data, and data received from a demand planning system, assortment optimization system, category management system, transportation management system, labor management system, and warehouse management system. Although particular planning and execution systems of particular types of supply chain networks 100 are shown and described, embodiments contemplate supply chain database 130 storing data received from planning and execution systems for any type of supply chain network 100 and data received from one or more locations local to, or remote from, supply chain network 100, such as, for example, social media data, weather data, social trends, and the like.

Figure 4:
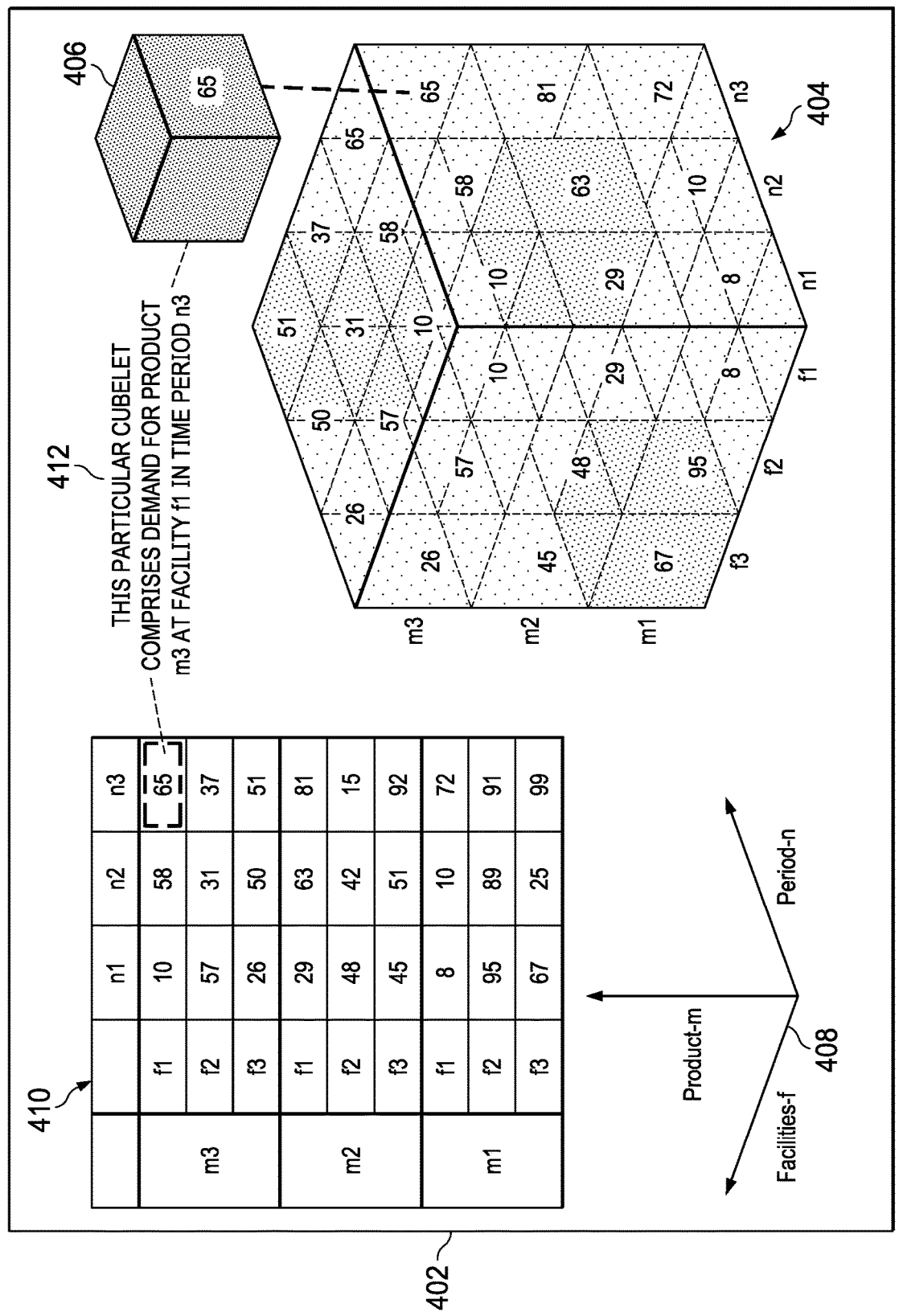
FIG. 4 illustrates an exemplary first mixed-reality cuboid visualization display, according to an embodiment.

Cloud datastore 140 receives and stores demographic and economic data, which is accessed by mixed-reality visualization system 110 and mapped to one or more mixed-reality cuboid visualizations, illustrated by FIG. 4. Although cloud datastore 140 is shown and described as comprising demographic and economic data, according to an embodiment, embodiments contemplate cloud datastore 140 storing any type of data received from any one or more locations local to, or remote from, supply chain network 100.

Mixed-reality visualization system 110, one or more rendering devices 120, supply chain database 130, cloud datastore 140, and one or more supply chain entities 150 may operate on one or more computers 160 that are integral to or separate from the hardware and/or software that support that mixed-reality visualization system 110, one or more rendering devices 120, supply chain database 130, cloud datastore 140, and one or more supply chain entities 150. Computers 160 may include any suitable input device 162, such as a keypad, mouse, touch screen, joystick, navigation control device, microphone, or other device to input information to mixed-reality visualization system 110, one or more rendering devices 120, supply chain database 130, cloud datastore 140, one or more supply chain entities 150, and computer 160. Computers 160 may include output device 164, which may convey information associated with the operation of mixed-reality visualization system 110, including digital or analog data, visual information, or audio information such as, for example, one or more displays, monitors, speakers, headsets, and/or haptics. Computers 160 may include fixed or removable computer-readable storage media, including a non-transitory computer readable medium, magnetic computer disks, flash drives, CD-ROM, in-memory device or other suitable media to receive output from and provide input to mixed-reality visualization system 110. Computers 160 may include one or more processors and associated memory to execute instructions and manipulate information according to the operation of mixed-reality visualization system 110 and any of the methods described herein. In addition, or as an alternative, embodiments contemplate executing the instructions on computers 160 that cause computers 160 to perform functions of the method. Further examples may also include articles of manufacture including tangible computer-readable media that have computer-readable instructions encoded thereon, and the instructions may comprise instructions to perform functions of the methods described herein.

Although single computer 160 is illustrated in FIG. 1, mixed-reality visualization system 110, one or more rendering devices 120, supply chain database 130, cloud datastore 140, and one or more supply chain entities 150 may each operate on separate computers 160 or may operate on one or more shared computers 160. Each of one or more computers 160 may be a work station, personal computer (PC), network computer, notebook computer, tablet, personal digital assistant (PDA), cell phone, telephone, wireless data port, mobile device, or any other suitable computing device. In an embodiment, one or more users may be associated with mixed-reality visualization system 110. These one or more users may include, for example, a "manager" or a "planner" handling inventory planning, packing, and/or shipping for items of one or more supply chain entities 150 based, at least in part, on altered parameters received from mixed-reality visualization system 110 in response to a user input and/or one or more related tasks within supply chain network 100. In addition, or as an alternative, these one or more users within supply chain network 100 may include, for example, one or more computers 160 programmed to autonomously handle, among other things, one or more supply chain processes such as demand planning, supply and distribution planning, inventory management, allocation planning, and/or order fulfilment.

In one embodiment, one or more supply chain entities 150 represent one or more supply chain networks, including, for example, one or more enterprises, and may comprise one or more suppliers, manufacturers, distribution centers, retailers, and/or customers. A supplier may be any suitable entity that offers to sell or otherwise provides one or more items (i.e., materials, components, or products) to one or more manufacturers. Items may comprise, for example, parts or supplies used to generate products. An item may comprise a part of the product, or an item may comprise a supply that is used to manufacture the product, but does not become a part of the product, for example, a tool, energy, or resource. According to some embodiments, items comprise foods or ingredients. According to other embodiments, items and products may each receive a Universal Product Code (UPC), RFID tag, or barcode that identifies (including uniquely identifying) the item or product. Such suppliers may comprise automated distribution systems that automatically transport products to one or more manufacturers based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, retailer, a customer, or any other suitable entity. Such manufacturers may comprise automated robotic production machinery that produce products based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

A distribution center may be any suitable entity that offers to store or otherwise distributes at least one product to one or more retailers and/or customers. A distribution center may, for example, receive a product from another entity in supply chain network 100 and store and transport the product for another supply chain entity. Such distribution centers may comprise automated warehousing systems that automatically remove products from and place products into inventory based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

Although one or more supply chain entities 150 are shown and described as separate and distinct entities, the same entity may simultaneously act as any other of one or more supply chain entities 150. For example, one or more supply chain entities 150 acting as a manufacturer can produce a product, and the same entity can act as a supplier to supply an item to itself or another supply chain entity. Although one example of supply chain network 100 is shown and described, embodiments contemplate any suitable supply chain network 100, according to particular needs.

In one embodiment, mixed-reality visualization system 110, one or more rendering devices 120, supply chain database 130, cloud datastore 140, one or more supply chain entities 150, and the one or more computers 160 are coupled with network 170 using communications links 180-190, which may be any wireline, wireless, or other link suitable to support data communications between mixed-reality visualization system 110, one or more rendering devices 120, supply chain database 130, cloud datastore 140, one or more supply chain entities 150, and the one or more computers 160 and network 170 during operation of supply chain network 100. Although communication links 180-190 are shown as generally coupling mixed-reality visualization system 110, one or more rendering devices 120, supply chain database 130, cloud datastore 140, one or more supply chain entities 150, and computer 160 with network 170, mixed-reality visualization system 110, one or more rendering devices 120, one or more supply chain databases 130, one or more cloud datastores 140, one or more supply chain entities 150, and computers 160 may communicate directly with mixed-reality visualization system 110, one or more rendering devices 120, supply chain database 130, cloud datastore 140, one or more supply chain entities 150, and computer 160, according to particular needs.

In other embodiments, network 170 includes the Internet and any appropriate local area networks (LANs), metropolitan area networks (MANs), or wide area networks (WANs) coupling mixed-reality visualization system 110, one or more rendering devices 120, supply chain database 130, cloud datastore 140, one or more supply chain entities 150, and computers 160. For example, data may be maintained by mixed-reality visualization system 110 at one or more locations external to mixed-reality visualization system 110, one or more rendering devices 120, supply chain database 130, cloud datastore 140, one or more supply chain entities 150, and computers 160 and made available to one or more associated users of mixed-reality visualization system 110, one or more rendering devices 120, supply chain database 130, cloud datastore 140, one or more supply chain entities 150, and computers 160 using network 170 or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, mixed-reality visualization system 110 may generate an inventory plan, packing plan, or shipping plan for the items of one or more supply chain entities 150 in supply chain network 100 based, at least in part, on altered parameters received from mixed-reality visualization system 110 in response to a user input, such as, for example, an instruction to increase capacity at one or more supply chain locations, altering demand or supply levels at one or more supply chain entities 150, siting a warehouse or distribution center for a potential demand region, or other interactions described herein. Furthermore, mixed-reality visualization system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on one or more generated inventory plans, packing plans, or shipping plans and/or current inventory or production levels. For example, the methods described herein may include computers 160 receiving product data from automated machinery having at least one sensor and product data corresponding to an item detected by the automated machinery. The received product data may include an image of the item, an identifier, as described above, and/or other product data associated with the item (dimensions, texture, estimated weight, and any other like data). The method may further include computers 160 looking up received product data in a database system associated with mixed-reality visualization system 110 to identify the item corresponding to the product data received from the automated machinery.

Computers 160 may also receive, from the automated machinery, a current location of the identified item. Based on the identification of the item, computers 160 may also identify (or alternatively generate) a first mapping in a database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to one or more rendering devices 120 or automated machinery based, as least in part, on one or more differences between the first mapping and the second mapping such as, for example, to locate items to add to or remove from an inventory, container, or package for one or more supply chain entities 150.

According to these embodiments, mixed-reality visualization system 110 may determine a difference between current inventory levels and the inventory reorder points for one or more items in an inventory. Based on the difference, mixed-reality visualization system 110 may instruct the automated machinery to add items to a shipment in an amount equal to the inventory target quantities minus the difference between current inventory levels and the inventory reorder points. For example, mixed-reality visualization system 110 may determine an inventory plan, packing plan, or shipping plan based on forecasted demand, current inventory levels, forecasted production levels, item attributes, pack constraints, store constraints, and the like. Based on these factors and constraints, mixed-reality visualization system 110 generates instructions, feedback, and a visualization of supply chain network 100 via one or more rendering devices 120.

FIG. 2 illustrates mixed-reality visualization system 110, one or more rendering devices 120, supply chain database 130, and cloud datastore 140 of FIG. 1 in greater detail, in accordance with an embodiment. As described above, mixed-reality visualization system 110 comprises server 112 and database 114. Although mixed-reality visualization system 110 is illustrated as comprising single server 112 and single database 114, embodiments contemplate any number of servers 112 or databases 114 internal to, or externally coupled with, mixed-reality visualization system 110, according to particular needs.

Database 114 of mixed-reality visualization system 110 comprises supply chain network models 210, supply chain static data 212, modified supply chain data 214, data processing and transformation models 216, instructions data 218, KPI data 220, supply chain analytics 222, supply chain alerts 224, and mixed-reality cuboid visualization data 226. Although database 114 is shown and described as comprising supply chain network models 210, supply chain static data 212, modified supply chain data 214, data processing and transformation models 216, instructions data 218, KPI data 220, supply chain analytics 222, supply chain alerts 224, and mixed-reality cuboid visualization data 226, embodiments contemplate any number or combination of data stored at one or more locations local to, or remote from, mixed-reality visualization system 110, such as on multiple servers 112 or computers 160 at any location in supply chain network 100.

According to embodiments, mixed-reality visualization system 110 uses one or more supply chain network models 210 to display supply chain static data 212, modified supply chain data 214, and/or supply chain data 132 and/or cloud datastore 140 data using one or more mixed-reality cuboid visualizations, described in greater detail below. In addition, mixed-reality visualization system 110 utilizes one or more supply chain network models 210 to process modified supply chain data 214 generated by one or more rendering devices 120 in response to and based, at least in part, on one or more user interactions with mixed-reality user interface 202 such as, for example, physical, visual, and voice inputs and feedback, which may be stored as instructions data 218.

In addition, mixed-reality visualization system 110 uses one or more data processing and transformation models 216 (which may include, for example, one or more heuristic models) to generate KPIs (which may be stored as KPI data 220) for mapping to mixed-reality cuboid visualizations and to receive input and other instructions generated by one or more rendering devices 120, such as for example, one or more user interactions with mixed-reality user interface 202 such as, for example, physical, visual, and voice inputs and feedback, which may be stored as instructions data 218.

KPI data 220 may comprise the aggregated values of input or output fields for records in different tables. KPIs may also comprise the optimal values of one or more variables as received in response to formulating the constraints and objectives or solving a mixed-integer linear programming problem.

Supply chain analytics 222 comprise input data, output data, and/or values of various objectives which may be displayed at a detailed level or aggregated over one or more dimensions. Embodiments of mixed-reality visualization system 110 contemplate supply chain analytics 222 comprising answers displayed by mixed-reality visualization system 110 in response to simple or complex queries. By way of example only and not by limitation, mixed-reality visualization system 110 may receive a query spoken by a user, such as, for example, "Show me a three-dimensional representation of products sold at Facility 1 from October-December 2019." In response to the received query, mixed-reality visualization system 110 may generate or alter a mixed-reality cuboid visualization to display a cuboid representing products sold at Facility 1 from October-December 2019.

According to embodiments, mixed-reality visualization system 110 provides for monitoring one or more supply chain processes, detecting an exception or problem condition (such as, for example, a KPI that is outside of a predetermined threshold), and generating one or more supply chain alerts 224. Supply chain alerts 224 may comprise changing the color, size, or other properties of mapped features (such as, for example, one or more nodes of supply chain network 100) as well as any type of visual, auditory, or haptic cues. Mixed-reality cuboid visualization data 226 may store one or more mixed-reality cuboid visualizations generated by mixed-reality user interface 202.

Server 112 of mixed-reality visualization system 110 comprises mixed-reality user interface 202 and data processing and transformation module 204. Although server 112 is shown and described as comprising single mixed-reality user interface 202 and single data processing and transformation module 204, embodiments contemplate any suitable number or combination of mixed-reality user interfaces 202 and data processing and transformation modules 204 located at one or more locations, local to, or remote from mixed-reality visualization system 110, such as on multiple servers 112 or computers 160 at any location in supply chain network 100.

Mixed-reality user interface 202 generates and modifies a mixed-reality cuboid visualization comprising a manipulable multi-dimensional cuboid, comprised of individual cubelets representing selectable aspects of supply chain data 132 (such as, for example, a particular product-location-time period combination that comprises the number of products sold at a particular location on a particular day), that displays one or more parameters of supply chain network 100. Mixed-reality user interface 202 may provide for the navigation (such as, for example, zooming in and out, rotation, internal or external viewing, and the like) and manipulation (such as, for example, expanding, compressing, aggregating, slicing, and dicing) of the mixed-reality cuboid visualization by receiving physical, visual, and voice input from one or more rendering devices 120. In addition, mixed-reality user interface 202 generates interactive displayed data in the form of mixed-reality cuboid visualizations (such as, for example, nodes of supply chain network 100, supply chain metrics and parameters, and the like) by receiving input from one or more rendering devices 120.

Mixed-reality user interface 202 may model one or more supply chain planning problems (such as, for example, an inventory planning problem, a master planning problem, and the like), identify resources, operations, buffers, and pathways, and map supply chain network 100 using supply chain network models 210 and/or the supply chain data models 242.

According to embodiments, data processing and transformation module 204 modifies supply chain data 132 in response to receiving input or instructions from one or more rendering devices 120. According to one embodiment, data processing and transformation module 204 generates a solution to the supply chain planning problem mapped to the mixed-reality cuboid visualization based, at least in part, on input and instructions received from one or more rendering devices 120. As described below, mixed-reality visualization system 110 selects KPIs and other data outputs for display on a mixed-reality cuboid visualization using one or more data processing and transformation modules 204.

One or more rendering devices 120 comprises sensors 122, processors 124, memory 126, and display 128, as described above. According to one embodiment, one or more rendering devices 120 comprise sensors 122 comprising a gaze tracking sensor, hand gesture sensor, and head orientation sensor. According to other embodiments, one or more rendering devices 120 provides a spatial visualization of a mixed-reality cuboid visualization providing for viewing, hearing, and/or receiving haptics conveying supply chain data 132, KPI data 220, supply chain analytics 222, feedback, and other data through a device such as a mixed-reality headset (for example, the MICROSOFT HOLOLENS, META 2 or EPSON MOVERIO BT-200 mixed-reality headsets). According to embodiments, one or more rendering devices 120 may receive one or more user inputs for search, navigation, visualization, and supply chain action. Embodiments contemplate a mixed-reality headset that provides user input by one or more of voice tracking, gaze tracking, hand gesture tracking, and incremental discovery (i.e. looking in a direction to discover the related supply chain components). Additionally, one or more sensors 122 of one or more rendering devices 120 may be located at one or more locations local to, or remote from, one or more rendering devices 120, including, for example, one or more sensors 122 integrated into one or more rendering devices 120 or one or more sensors 122 remotely located from, but communicatively coupled with, one or more rendering devices 120. As described above, one or more rendering devices 120 may include one or more processors 124 and associated memory 126 to execute instructions and manipulate information according to the operation of mixed-reality visualization system 110 and any of the methods described herein.

For example, a user may navigate mixed-reality user interface 202 by speaking a command (such as, for example, "show me the location with the highest shortage" or other like command), by gazing or staring at a particular supply chain network 100 component (such as, for example, staring at a location causes mixed-reality visualization system 110 to alter the color of a visual element to illustrate the amount of demand satisfaction at a node at, or near to, the location), and/or by tracking movements of a hand, finger, or arm of a user (such as, for example, tapping on a mixed-reality surface displayed by one or more rendering devices 120 such as, for example, a graphic representing an end item, causes mixed-reality visualization system 110 to render and/or display a graphic representing the raw-material that is consumed by production of the end item).

Display 128 of one or more rendering devices 120 may comprise for example, a projector, a monitor, an LCD panel, or any other suitable electronic display device. Embodiments contemplate one or more rendering devices 120 having more than one display 128, including a first display configured to direct an image into a user's left eye (a left eye display) and a second display configured to direct an image into a user's right eye (a right eye display) to provide a mixed-reality visualization by, for example, displaying visual elements on a transparent or translucent medium directly in front of a user's eyes, so that the visual element appears within the visual field of the user. One or more rendering devices 120 display visual elements overlaid on real-world scenes and located based, at least in part, on the calculated visual field of the user. According to embodiments, information may be projected, overlaid, superimposed, or displayed such that the rendered and displayed images, text, and graphics are fixed in a virtual three-dimensional space anchored with a point or object in the environment, in a virtual space, or an orientation of the user or of one or more rendering devices 120. In addition, or as an alternative, display 128 may display a mixed-reality visualization on an opaque display by overlaying one or more visual elements over a visual feed from a camera, and altering the appearance and placement of the visual elements based, at least in part, on the movement of objects within the visual feed of the camera and/or one or more sensors 122. According to some embodiments, mixed-reality visualization system 110 arranges visual indicators representing one or more supply chain entities 150 on the inner or outer surface of a mixed-reality cuboid visualization, based, at least in part, on the field of view of display 128 of one or more rendering devices 120.

As described above, mixed-reality visualization system 110 communicates with one or more external database 114 storage systems such as, for example, supply chain database 130, cloud datastore 140, or one or more other data storage systems local to, or remote from, supply chain network 100.

Supply chain database 130 may comprise one or more databases 114 or other data storage arrangement at one or more locations, local to, or remote from, supply chain network 100. Supply chain database 130 comprises supply chain data 132 including, by way of example only and not of limitation, supply chain planning data 230, product data 232, historical retail data 234, inventory data 236, supply chain models 238, inventory policies 240, and supply chain data models 242. Although supply chain database 130 is shown and described as comprising supply chain planning data 230, product data 232, historical retail data 234, inventory data 236, supply chain models 238, inventory policies 240, and supply chain data models 242, embodiments contemplate any suitable number or combination of these, located at one or more locations, local to, or remote from, supply chain database 130, according to particular needs.

As an example only and not by way of limitation, supply chain database 130 stores supply chain planning data 230, including one or more supply chain planning problems of supply chain network 100 that may be used by mixed-reality visualization system 110. Supply chain planning data 230 may comprise for example, various decision variables, business constraints, goals, and objectives of one or more supply chain entities 150. According to some embodiments, supply chain planning data 230 may comprise hierarchical objectives specified by, for example, business rules, master planning requirements, scheduling constraints, and discrete constraints, including, for example, sequence dependent setup times, lot-sizing, storage, shelf life, and the like.

Product data 232 of supply chain database 130 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 232 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Historical retail data 234 of supply chain database 130 may comprise, for example, any data relating to past sales, past demand, purchase data, promotions, events, or the like of one or more supply chain entities 150. Historical retail data 234 may cover a time interval such as, for example, by the minute, hourly, daily, weekly, monthly, quarterly, yearly, or any suitable time interval, including substantially in real time. According to embodiments, historical retail data 234 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 236 of supply chain database 130 may comprise any data relating to current or projected inventory quantities or states, order rules, or the like. For example, inventory data 236 may comprise the current level of inventory for each item at one or more stocking locations across supply chain network 100. In addition, inventory data 236 may comprise order rules that describe one or more rules or limits on setting an inventory policy, including, but not limited to, a minimum order quantity, a maximum order quantity, a discount, a step-size order quantity, and batch quantity rules. According to some embodiments, mixed-reality visualization system 110 accesses and stores inventory data 236 in supply chain database 130, which may be used by one or more planning and execution systems of one or more supply chain entities 150 to place orders, set inventory levels at one or more stocking points, initiate manufacturing of one or more items (or components of one or more items), or the like. In addition, or as an alternative, inventory data 236 may be updated by receiving current item quantities, mappings, or locations from an inventory system, a transportation network, one or more rendering devices 120, and/or one or more supply chain entities 150.

Supply chain models 238 of supply chain database 130 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 238 may also comprise characteristics that specify the structure of supply chain network 100 in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to a different supply chain model of supply chain models 238.

Inventory policies 240 of supply chain database 130 may comprise any suitable inventory policy describing the reorder point and target quantity, or other inventory policy parameters that set rules for one or more planning and execution systems of one or more supply chain entities 150 to manage and reorder inventory. Inventory policies 240 may be based on target service level, demand, cost, fill rate, or the like. According to embodiments, inventory policies 240 may be used by mixed-reality visualization system 110 to determine a no-stockout probability, fill rate, cost, or other like determination of KPI targets, as described below. According to embodiment, inventory policies 240 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although a particular target service level and percentage is described, embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, one or more planning and execution systems of one or more supply chain entities 150 may determine a replenishment order according to one or more replenishment rules, which, among other things, indicates to one or more supply chain entities 150 to determine or receive inventory to replace the depleted inventory.

Supply chain data models 242 represent the flow of materials through one or more supply chain entities 150 of supply chain network 100. Mixed-reality user interface 202 may model the flow of materials through one or more supply chain entities 150 of supply chain network 100 as one or more supply chain data models 242 comprising network 170 of nodes and edges. The material storage and/or transition units may be modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for the supply chain data models 242 may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100.

Cloud datastore 140 may comprise, in an embodiment, demographic and economic data 250. Demographic and economic data 250 may be maintained in cloud datastore 140 at one or more locations external to mixed-reality visualization system 110 or one or more rendering devices 120 and made available to one or more associated users of mixed-reality visualization system 110 and one or more rendering devices 120 using the cloud or in any other appropriate manner. Demographic and economic data 250 includes, for example, population data, population density, spending potential, per capita disposable income, and the like. Although cloud datastore 140 is shown as comprising demographic and economic data 250, embodiments contemplate any suitable number of this or other data, internal to, or externally coupled with, cloud datastore 140.

Figure 3:
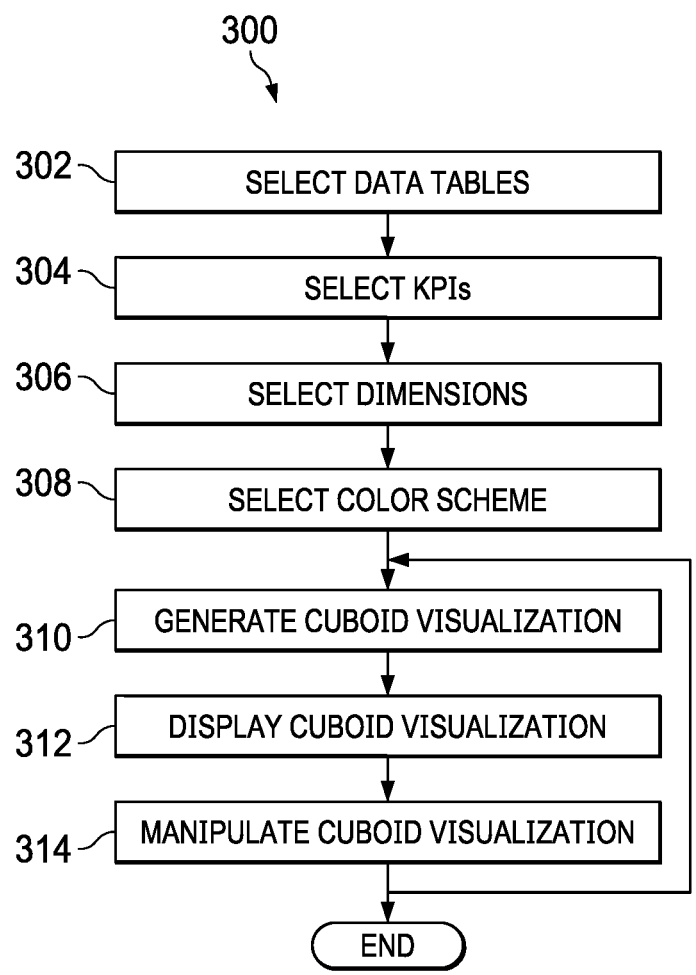
FIG. 3 illustrates an exemplary method of supply chain navigation and analysis using a mixed-reality cuboid visualization with spatial-aural feedback, in accordance with an embodiment.

FIG. 3 illustrates exemplary method 300 of supply chain navigation and analysis using a mixed-reality cuboid visualization with spatial-aural feedback, in accordance with an embodiment. Method 300 proceeds by one or more activities, which, although described in a particular order may be performed in one or more permutations, according to particular needs.

At action 302, data processing and transformation module 204 selects one or more data tables from which to render and visualize supply chain data 132 in a mixed-reality cuboid visualization. Data processing and transformation module 204 may access and select data stored in mixed-reality visualization system 110 database 114 (including but not limited to supply chain static data 212, modified supply chain data 214, supply chain network models 210, data processing and transformation models 216, instructions data 218, KPI data 220, supply chain analytics 222, and supply chain alerts 224), and/or data stored in supply chain database 130 and/or cloud datastore 140. In an embodiment, one or more rendering devices 120 transmits physical, visual, and/or voice input, such as from one or more users operating one or more rendering devices 120, to data processing and transformation module 204 to select one or more data tables. In other embodiments, data processing and transformation module 204 may select one or more data tables automatically, or may receive input from one or more computers 160 in supply chain network 100 to select one or more data tables. Data processing and transformation module 204 stores the selection of one or more data tables in supply chain network models 210 data of mixed-reality visualization system 110 database 114.

At action 304, data processing and transformation module 204 selects one or more KPIs to render and visualize supply chain data 132 in a mixed-reality cuboid visualization. Data processing and transformation module 204 may access and select KPIs stored in mixed-reality visualization system 110 database 114 (including but not limited to KPI data 220), and/or data stored in supply chain database 130 and/or cloud datastore 140. In an embodiment, one or more rendering devices 120 transmits physical, visual, and/or voice input, such as from one or more users operating one or more rendering devices 120, to data processing and transformation module 204 to select one or more KPIs. In other embodiments, data processing and transformation module 204 may select one or more KPIs automatically, or may receive input from one or more computers 160 in supply chain network 100 to select one or more KPIs. Data processing and transformation module 204 stores the selection of one or more KPIs in supply chain network models 210 data.

At action 306, data processing and transformation module 204 selects the dimensions by which to render and visualize supply chain data 132 in a mixed-reality cuboid visualization. The mixed-reality cuboid visualization may display supply chain data 132, such as, for example, product sales, facilities at which products are sold, and sale time periods, as separate dimensional axes, as best illustrated by FIG. 4. In an embodiment, one or more rendering devices 120 transmits physical, visual, and/or voice input, such as from one or more users operating one or more rendering devices 120, to data processing and transformation module 204 to select one or more dimensions. In other embodiments, data processing and transformation module 204 may select one or more dimensions automatically, or may receive input from one or more computers 160 in supply chain network 100 to select one or more dimensions. Data processing and transformation module 204 stores the selection of one or more dimensions in supply chain network models 210 data.

At action 308, data processing and transformation module 204 selects the display color scheme of the mixed-reality cuboid visualization. The mixed-reality cuboid visualization may use a variety of colors to display and represent supply chain data 132, such as, for example, gray to represent standard product sales and purple, green, or blue to represent abnormal product sales, shipment shortages, and/or other supply chain exceptions. In an embodiment, one or more rendering devices 120 transmits physical, visual, and/or voice input, such as from one or more users operating one or more rendering devices 120, to data processing and transformation module 204 to select a display color scheme. In other embodiments, data processing and transformation module 204 may select one or more display color schemes automatically, or may receive input from one or more computers 160 in supply chain network 100 to select one or more dimensions. Data processing and transformation module 204 stores the selection of one or more display color schemes in supply chain network models 210 data.

At action 310, mixed-reality user interface 202 generates a mixed-reality cuboid visualization. Mixed-reality user interface 202 accesses the selection of one or more data tables, KPIs, dimensions, and color schemes stored in supply chain network models 210 data. Mixed-reality user interface 202 accesses data stored in mixed-reality visualization system 110 database 114, supply chain database 130, and/or cloud datastore 140 that corresponds to the selected one or more data tables. Mixed-reality user interface 202 generates a mixed-reality cuboid visualization displaying the selected data tables according to the selected KPIs, dimensions, and color schemes. Mixed-reality user interface 202 stores the generated mixed-reality cuboid visualization in mixed-reality cuboid visualization data 226 of mixed-reality visualization system 110 database 114. According to embodiments, the mixed-reality cuboid visualization may include one or more three-dimensional cuboid structures comprised of individual cubelets arranged in a plurality of configurations, as illustrated by FIGS. 4-7B.

At action 312, mixed-reality visualization system 110 and rendering device displays the generated mixed-reality cuboid visualization. Data processing and transformation module 204 accesses the mixed-reality cuboid visualization stored in mixed-reality cuboid visualization data 226. Data processing and transformation module 204 transmits the mixed-reality cuboid visualization to memory 126 of rendering device 120. Rendering device 120 accesses the mixed-reality cuboid visualization stored in memory 126 and displays the mixed-reality cuboid visualization on rendering device 120 display.

At action 314, mixed-reality visualization system 110 manipulates the mixed-reality cuboid visualization in response to input received by rendering device 120. Rendering device 120 sensors 122 detect physical, visual, and/or voice input, such as from a user operating rendering device 120. Rendering device 120 processors 124 transmit the physical, visual, and/or voice input to mixed-reality user interface 202 of mixed-reality visualization system 110 server 112. In response to the physical, visual, and/or voice input, mixed-reality user interface 202 manipulates the mixed-reality cuboid visualization. According to embodiments, manipulations to the mixed-reality cuboid visualization may include, for example, rotating one or more three-dimensional cuboid structures in virtual mixed-reality space, compressing the one or more three-dimensional cuboid structures, expanding the one or more three-dimensional cuboid structures, slicing the one or more three-dimensional cuboid structures into slices (illustrated by FIG. 5A) or stacks (illustrated by FIG. 5B), and/or manipulating intersections between slices and/or stacks (illustrated by FIGS. 7A-7B), as described in greater detail below. In response to such manipulations, mixed-reality visualization system 110 may generate and display revised mixed-reality cuboid visualizations. Mixed-reality visualization system 110 may then terminate method 300 if rendering device 120 receives no further input.

The following example illustrates the operation of mixed-reality visualization system 110 generating and manipulating a mixed-reality cuboid visualization. In this example, mixed-reality visualization system 110 executes the actions of the above-described method to (1) select parameters from which to generate a mixed-reality cuboid visualization, (2) generate a mixed-reality cuboid visualization including a three-dimensional cuboid, (3) display the mixed-reality cuboid visualization, and (4) manipulate the mixed-reality cuboid visualization in response to input received by rendering device 120 sensors 122. Although particular examples of mixed-reality visualization system 110 actions are illustrated and described herein, embodiments contemplate mixed-reality visualization system 110 generating and manipulating mixed-reality cuboid visualizations in any configuration, according to particular needs.

In this example, at action 302, data processing and transformation module 204 selects a "Product/Facility/Time Period" data table, stored in the historical retail data 234 of supply chain database 130, from which to render and visualize supply chain data 132 in a mixed-reality cuboid visualization. In this example, the "Product/Facility/Time Period" data table stores sales data relating to the sales of several products at multiple separate facilities over three separate time periods. In other embodiments, data processing and transformation module 204 may select and access any data tables stored at any location in supply chain network 100. In this example, rendering device 120 transmits voice input, in the form of a user stating "Access the 'Product/Facility/Time Period' data table," to data processing and transformation module 204 to select a data table at action 302. Data processing and transformation module 204 stores the selection of the "Product/Facility/Time Period" data table in supply chain network models 210 data of mixed-reality visualization system 110 database 114. In other embodiments, one or more rendering devices 120 may transmit physical, visual, and/or voice input, to data processing and transformation module 204 to select one or more data tables, data processing and transformation module 204 may select one or more data tables automatically, and/or data processing and transformation module 204 may receive input from one or more computers 160 in supply chain network 100 to select one or more data tables.

Continuing the example, and at action 304, data processing and transformation module 204 selects, as the relevant KPI to display on the mixed-reality cuboid visualization, "product sales at various facilities over time." As illustrated by FIG. 4, the selection of the "product sales at various facilities over time" KPI enables mixed-reality visualization system 110 to display a three-dimensional cuboid comprised of individual product-facility-time period sales data cubelets. Data processing and transformation module 204 stores the selection of the "product sales at various facilities over time" KPI in supply chain network models 210 data.

Continuing the example, and at action 306, data processing and transformation module 204 selects three dimensions—"products," "facilities," and "time periods," by which to render and visualize the "Product/Facility/Time Period" data table in a mixed-reality cuboid visualization. Data processing and transformation module 204 stores the selection of the "products," "facilities," and "time periods" dimensions in supply chain network models 210 data. At action 308, data processing and transformation module 204 selects a grayscale color scheme, in which shades of gray indicate individual cubelets and blue indicates a particular cubelet currently selected by mixed-reality user interface 202, and stores the grayscale color scheme in supply chain network models 210 data. In other embodiments not illustrated by this example, data processing and transformation module 204 may select, for example, a gray and blue color scheme, a purple, blue, and green color scheme, and/or any other color scheme.

Continuing the example, and at action 310, mixed-reality user interface 202 generates first mixed-reality cuboid visualization display 402, illustrated by FIG. 4. Mixed-reality user interface 202 accesses the selection of the "Product/Facility/Time Period" data table, the "product sales at various facilities over time" KPI, the "products," "facilities," and "time periods" dimensions, and the grayscale color scheme, stored in supply chain network models 210 data. Mixed-reality user interface 202 generates first mixed-reality cuboid visualization display 402, illustrated by FIG. 4, displaying a three-dimensional cuboid comprising the selected data tables according to the selected KPIs, dimensions, and color schemes. Mixed-reality user interface 202 stores the generated first mixed-reality cuboid visualization display 402 in mixed-reality cuboid visualization data 226 of mixed-reality visualization system 110 database 114.

Continuing the example, and at action 312, mixed-reality visualization system 110 and rendering device 120 display the generated first mixed-reality cuboid visualization display 402. Data processing and transformation module 204 accesses first mixed-reality cuboid visualization display 402, stored in mixed-reality cuboid visualization data 226. Data processing and transformation module 204 transmits first mixed-reality cuboid visualization display 402 to memory 126 of rendering device 120. Rendering device 120 accesses first mixed-reality cuboid visualization display 402 stored in memory 126 and displays first mixed-reality cuboid visualization display 402 on rendering device 120 display.

FIG. 4 illustrates exemplary first mixed-reality cuboid visualization display 402, according to an embodiment. First mixed-reality cuboid visualization display 402 may comprise three-dimensional cuboid 404 comprised of a plurality of individual cubelets 406, display dimensions 408, cubelet data table 410, and explanatory text 412. Although FIG. 4 illustrates exemplary first mixed-reality cuboid visualization display 402 as comprising three-dimensional cuboid 404 comprised of a plurality of cubelets 406, display dimensions 408, cubelet data table 410, and explanatory text 412 in a particular configuration, embodiments contemplate mixed-reality visualization system 110, mixed-reality user interface 202, and one or more rendering devices 120 generating mixed-reality cuboid visualization displays of any configuration and displaying any data stored in database 114, supply chain data 132, and/or cloud datastore 140 in any visual format, according to particular needs.

Continuing the example, in the embodiment illustrated by FIG. 4, first mixed-reality cuboid visualization display 402 comprises three-dimensional cuboid 404 comprised of twenty-seven (27) individual cubelets 406, each of which represents an individual product-facility-time period sales intersection, corresponding to one cell on cubelet data table 410. First mixed-reality cuboid visualization display 402 displays data contained in the "Product/Facility/Time Period" data table (displayed by cubelet data table 410) according to the "product sales at various facilities over time" KPI and the three selected dimensions: "products," "facilities," and "time periods" (indicated by display dimensions 408). In the embodiment illustrated by FIG. 4, first mixed-reality cuboid visualization display 402 displays the sales of three separate products (in this example, m1, m2, and m3) sold at three separate facilities (in this example, f1, f2, and f3) across three separate time periods (in this example, n1, n2, and n3), comprising 27 individual product-facility-time period sales intersections. In this example, mixed-reality user interface 202 displays each of the 27 individual product-facility-time period sales intersections as an individual cubelet 406, arranged to comprise three-dimensional cuboid 404 according to the "products," "facilities," and "time periods" dimensions. According to embodiments, explanatory text 412 may display one or more text messages, generated by mixed-reality user interface 202, to provide additional information explaining the arrangement and details of first mixed-reality cuboid visualization display 402. Although FIG. 4 illustrates first mixed-reality cuboid visualization display 402 in a particular configuration, embodiments contemplate mixed-reality visualization system 110 organizing and displaying cubelets in any cuboid configuration, according to particular needs.

Figure 5A:
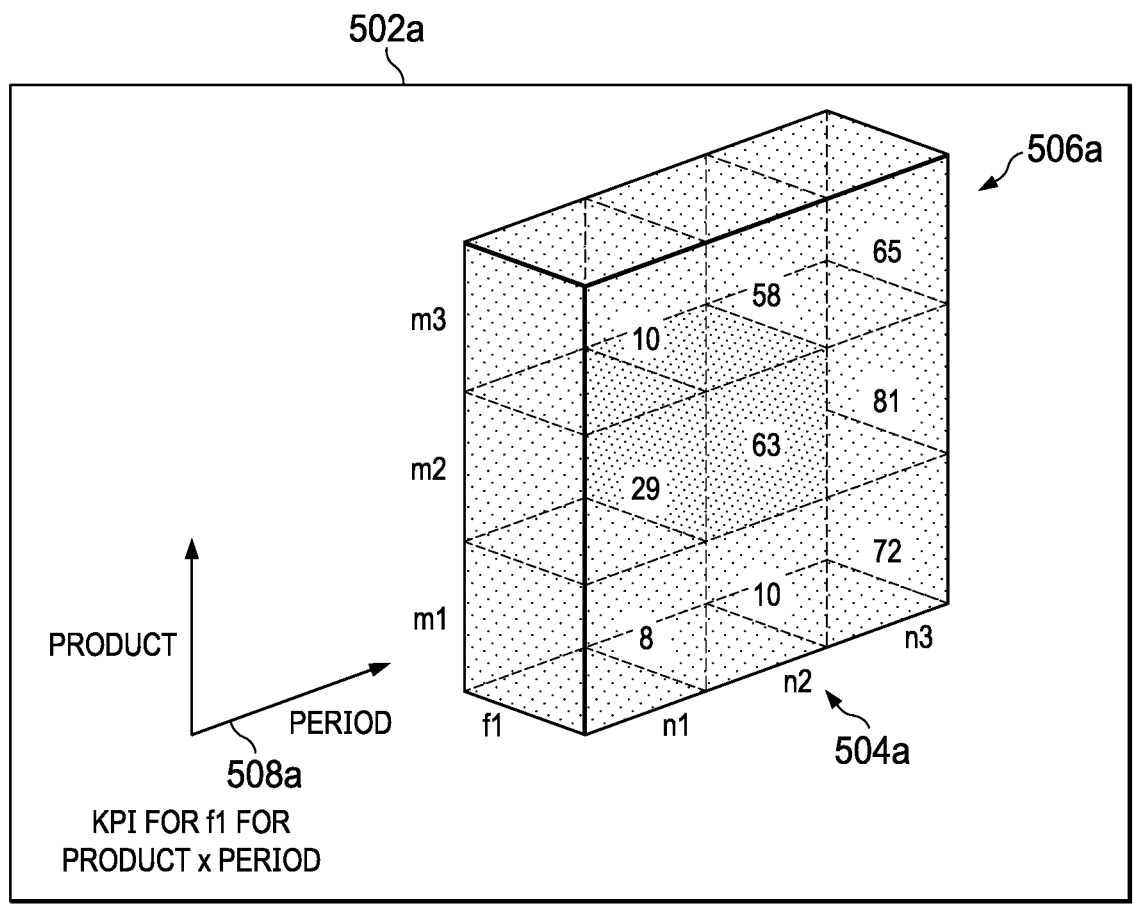
FIGS. 5A and 5B illustrate exemplary second and third mixed-reality cuboid visualizations, according to embodiments.
Figure 5B:
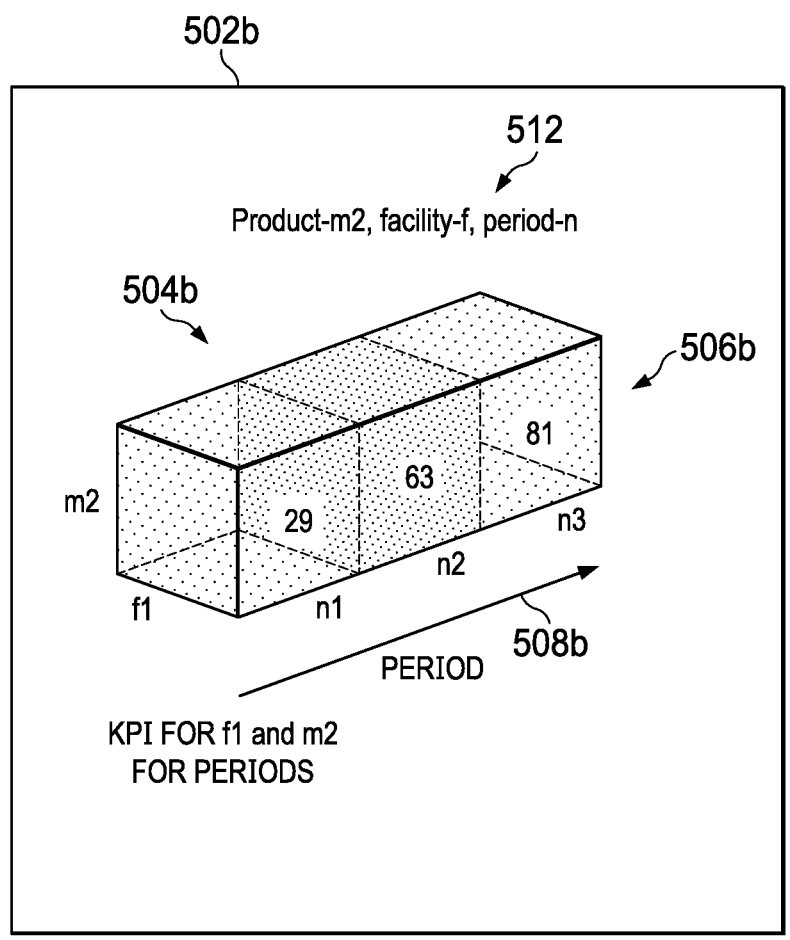

FIGS. 5A and 5B illustrate exemplary second and third mixed-reality cuboid visualizations, according to embodiments. FIG. 5A illustrates exemplary second mixed-reality cuboid visualization display 502a, comprising three-dimensional cuboid 504a comprised of nine (9) cubelets 506a, and display dimensions 508. FIG. 5B illustrates exemplary third mixed-reality cuboid visualization display 502b, comprising three-dimensional cuboid 504b comprised of three (3) cubelets 506b, display dimensions 508b, and explanatory text 512. Although FIGS. 5A and 5B illustrate exemplary second and third mixed-reality cuboid visualization displays 502a and 502b in particular configurations, embodiments contemplate mixed-reality visualization system 110, mixed-reality user interface 202, and one or more rendering devices 120 generating mixed-reality cuboid visualization displays of any configuration and displaying any data stored in database 114, supply chain data 132, and/or cloud datastore 140 in any visual format, according to particular needs.

Continuing the example, FIGS. 5A and 5B illustrate other mixed-reality cuboid visualizations (as compared to first mixed-reality cuboid visualization display 402) generated by mixed-reality user interface 202 from the "Product/Facility/Time Period" data table according to the "product sales at various facilities over time" KPI and various dimensions. FIG. 5A illustrates three-dimensional cuboid 504a displayed as a cuboid "slice," which illustrates product-facility-time period sales intersection cubelets 506a for multiple products (m1, m2, and m3) sold at single facility (f1) over multiple time periods (n1, n2, and n3). FIG. 5B illustrates three-dimensional cuboid 504b illustrated as a cuboid "stack," which illustrates product-facility-time period sales intersection cubelets 506b for single product (m2) sold at single facility (f1) over multiple time periods (n1, n2, and n3). Mixed-reality user interface 202 may allow one or more users of one or more rendering devices 120 to manipulate one or more cuboids to select and visualize different configurations of cubelets, according to particular needs.

Continuing the example, and at action 314, mixed-reality visualization system 110 manipulates first mixed-reality cuboid visualization display 402 illustrated by FIG. 4 in response to input received by rendering device 120. In this example, rendering device 120 sensors 122 detect physical input from a user operating rendering device 120. Rendering device 120 processors 124 transmit the physical input to mixed-reality user interface 202 of mixed-reality visualization system 110 server 112. In this example, in response to the physical input, mixed-reality user interface 202 manipulates three-dimensional cuboid 404 by compressing three-dimensional cuboid 404 and by aggregating the values of the 27 cubelets 406 that comprise three-dimensional cuboid 404, as illustrated by FIG. 6.

Figure 6:
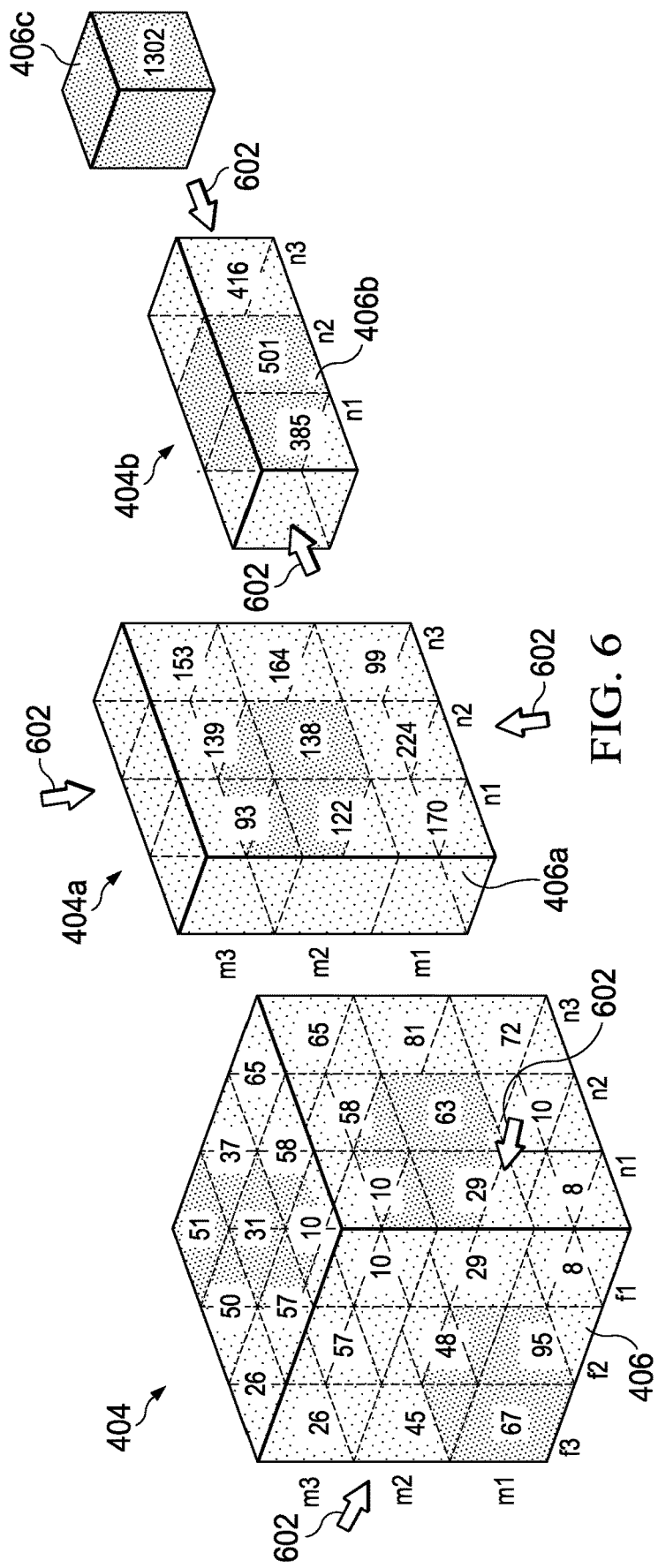
FIG. 6 illustrates an exemplary "pressing" manipulation of a three-dimensional cuboid, according to an embodiment.

FIG. 6 illustrates an exemplary "pressing" manipulation of three-dimensional cuboid 404, according to an embodiment. In this embodiment, FIG. 6 illustrates mixed-reality visualization system 110 compressing three-dimensional cuboid 404 and aggregating the values of cubelets 406 that comprise three-dimensional cuboid visualization 404. Continuing the example, a user operates rendering device 120 and inputs a "pressing" physical action (illustrated in FIG. 6 by pressing arrows 602 which represent pressing inward on a shape from opposite directions) to rendering device 120 sensors 122. In response to the "pressing" physical action, mixed-reality visualization system 110 compresses three-dimensional cuboid 404 (which comprises 27 cubelets 406 representing each possible product-facility-time period sales interaction between the three products (m1-m3) sold at the three facilities (f1-f3) over the three time periods (n1-n3)) into "Product/Time Period" three-dimensional cuboid slice 404a. Mixed-reality visualization system 110 returns to action 310 to generate "Product/Time Period" three-dimensional cuboid slice 404a, and proceeds again to action 312 to display "Product/Time Period" three-dimensional cuboid slice 404a using rendering device 120.

Continuing the example, "Product/Time Period" three-dimensional cuboid slice 404a comprises 9 cubelets 406a. In this example, in response to rendering device 120 input of "pressing" three-dimensional cuboid 404 (comprising 27 cubelets 406) into "Product/Time Period" three-dimensional cuboid slice 404a (comprising 9 cubelets 406a), mixed-reality user interface 202 aggregates data for all three facilities (f1-f3) into single cubelet 406a for each product (m1-m3) sold over the three time periods (n1-n3). For example, in original "Product/Facility/Time Period" three-dimensional cuboid 404, product m1 sold 8 units at facility f1, 95 units at facility f2, and 67 units at facility f3 over time period n1. In "Product/Time Period" three-dimensional cuboid slice 404a, and in this example, mixed-reality user interface 202 aggregates, via summation, the number of m1 products sold over time period n1 at all three facilities f1-f3 into single cubelet 406a of 170 m1 products sold during time period n1 (8+95+67=170). In other embodiments not illustrated by FIG. 6, mixed-reality user interface 202, in response to one or more "pressing" inputs from rendering device 120, may use any aggregation method to combine and aggregate cubelets, including but not limiting to calculating the mean value of the aggregated cubelets, calculating the median value, calculating the mode, summing the values of the to-be-aggregated cubelets, or displaying the highest single value of the to-be-aggregated cubelets.

Continuing the example, in response to subsequent "pressing" physical action detected by rendering device 120 sensors 122 to the top and bottom of "Product/Time Period" three-dimensional cuboid slice 404a, mixed-reality visualization system 110 compresses "Product/Time Period" three-dimensional cuboid slice 404a (comprising 9 cubelets 406a) into "Time Period" mixed-reality cuboid stack 404b (comprising 3 cubelets 406b). In this example, "Time Period" mixed-reality cuboid stack 404b displays the summed sales of all products (m1-m3) sold at all facilities (f1-f3) for each of the three time periods (n1-n3). Continuing further with this example, in response to subsequent "pressing" physical action detected by rendering device 120 sensors 122 to the left and right edges of "Time Period" mixed-reality cuboid stack 404b, mixed-reality visualization system 110 compresses "Time Period" mixed-reality cuboid stack 404b (comprising 3 cubelets 406b) into single "Total Sales" mixed-reality cubelet 406c. In this example, "Total Sales" mixed-reality cubelet 406c displays the summed sales of all products (m1-m3) sold at all facilities (f1-f3) over all three time periods (n1-n3) combined. Concluding with this example, mixed-reality visualization system 110 then terminates method 300.

Although the preceding example depicts mixed-reality visualization system 110 responding to "pressing" inputs to rendering device 120 sensors 122, embodiments contemplate mixed-reality visualization system 110 manipulating one or more mixed-reality cuboid visualizations in response to several types of input, including but not limited to physical inputs of any kind, visual input, and/or voice input. Physical inputs may comprise "twisting" actions to spin or alter the orientation of the mixed-reality cuboid visualization, "slicing" actions to "cut" the mixed-reality cuboid visualization into one or more "slices," "dicing" actions to cut slices into smaller cuboids or individual cubelets, or "pulling" actions to expand the dimensions of the mixed-reality cuboid visualization along one or more dimensional axes. In response to one or more "pulling" inputs, mixed-reality visualization system 110 may, for example, access additional data stored in mixed-reality visualization system 110 database 114 and/or supply chain database 130 or cloud datastore 140, and may generate and display one or more additional dimensions, KPIs, or cubelets along one or more axes.

Figure 7A:
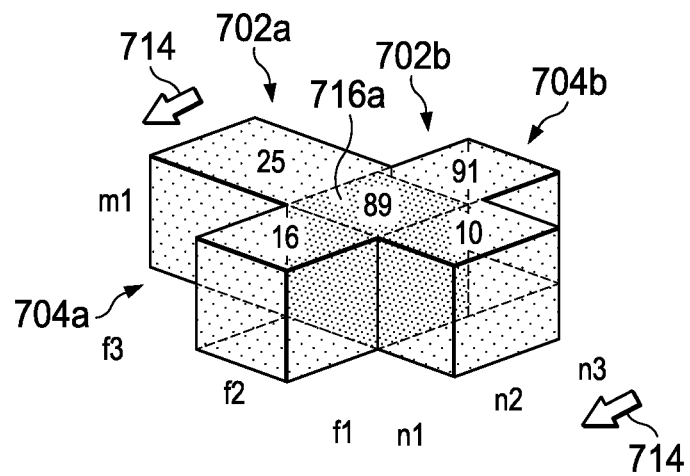
FIGS. 7A and 7B illustrate an exemplary "pulling" manipulation of three-dimensional cuboid stacks, according to an embodiment.
Figure 7B:
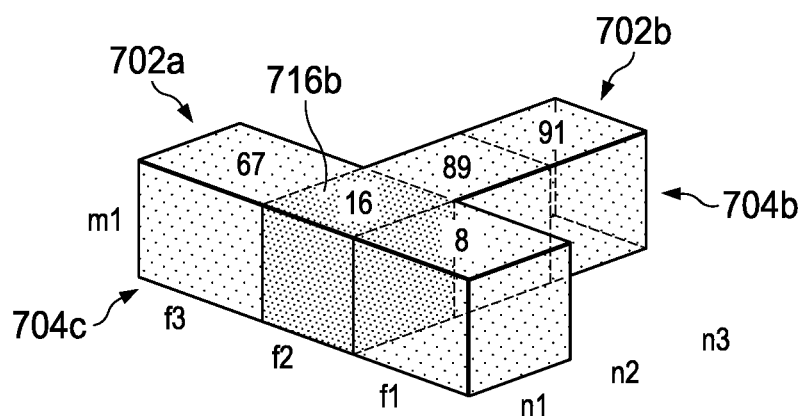

FIGS. 7A and 7B illustrate an exemplary "pulling" manipulation of three-dimensional cuboid stacks 702a and 702b, according to an embodiment. In the embodiment illustrated by FIGS. 7A-7B, mixed-reality visualization system 110 generates three-dimensional cuboid stacks 702a and 702b. In the initial configuration illustrated by FIG. 7A, three-dimensional cuboid stack 702a comprises three cubelets 704a displaying the sales of product m1 at three different facilities (f1, f2, and f3) in time period n2, and three-dimensional cuboid stack 702b comprises three cubelets 704b displaying the sales of product m1 at facility f2 over three time periods (n1, n2, and n3). In FIG. 7A, three-dimensional cuboid stacks 702a and 702b form an intersection at, and share, cubelet 716a, which displays 89 sales of product m1 at facility f2 in time period n2. As illustrated by FIG. 7A, mixed-reality visualization system 110 displays the intersection of three-dimensional cuboid stacks 702a and 702b, at cubelet 716a displaying 89 sales of product m1 at facility f2 in time period n2, by displaying cubelet 716a with unique shading.

In an embodiment, and as illustrated in FIG. 7A by pulling arrows 714 which represent a "pulling" action of three-dimensional cuboid stack 702a with respect to three-dimensional cuboid stack 702b, rendering device 120 sensors 122 may detect a leftward-directed "pulling" action imparted to three-dimensional cuboid stack 702a, and may transmit this input to mixed-reality visualization system 110. In response, and as illustrated by FIG. 7B, mixed-reality user interface 202 may "translate" three-dimensional cuboid stack 702a in a leftward direction relative to three-dimensional cuboid stack 702b, moving intersection cubelet 716b joining three-dimensional cuboid stacks 702a and 702b in the process, and reconfiguring which cubelets 704c comprise three-dimensional cuboid stack 702a. In the subsequent post-"pulling" configuration illustrated by FIG. 7B, three-dimensional cuboid stack 702a comprises three cubelets 704c displaying the sales of product m1 at three different facilities (f1, f2, and f3) in time period n1, and three-dimensional cuboid stack 702b comprises three cubelets 704b displaying the sales of product m1 at facility f2 over three time periods (n1, n2, and n3). In this manner, mixed-reality visualization system 110 may display and manipulate multiple mixed-reality cuboids, cuboid slices, cuboid stacks, or cubelets in response to various inputs detected by rendering device 120 sensors 122.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a computer, comprising a processor and memory, configured to:
generate a mixed-reality object comprising a visualization of a supply chain network and a first cuboid, the first cuboid comprising one or more adjustable display dimensions corresponding to one or more key process indicators and one or more cubelets divided along at least one of the one or more adjustable display dimensions; and
a mixed-reality display device, comprising a display and one or more sensors, and configured to:
display the mixed-reality object on the display, wherein the mixed-reality object further comprises visual and aural indicators;
navigate the visualization of the supply chain network;
display an alert associated with a detection of an exception or problem condition associated with the one or more key process indicators;
interact with the visualization of the supply chain network to modify the supply chain network; and
in response to the interaction with the visualization of the supply chain network, modify one or more supply chain processes.

2. The system of claim 1, wherein the mixed-reality display device is further configured to:
display and locate one or more visual elements overlaid on one or more real world scenes based, at least in part, on a calculated visual field of a user.

3. The system of claim 1, wherein the one or more sensors of the mixed-reality display device comprise one or more of: a gaze tracking sensor, a hand gesture sensor, and a head orientation sensor.

4. The system of claim 1, wherein the mixed-reality display device is further configured to:
modify the one or more supply chain processes using one or more of: speech, eye movement, hand gesture and spoken instructions.

5. The system of claim 1, wherein the mixed-reality display device further comprises a first display to display an image into a user's left eye and a second display to display an image into the user's right eye.

6. The system of claim 1, wherein the mixed-reality display device is further configured to:
alter an appearance and a placement of one or more visual elements of the visualization of the supply chain network based, at least in part, on movement of one or more objects within a visual feed of a camera.

7. The system of claim 1, wherein the one or more supply chain processes comprise one or more of:
demand planning, supply and distribution planning, inventory management, allocation planning and order fulfillment.

8. A computer-implemented method, comprising:
generating, by a computer comprising a processor and memory, a mixed-reality object comprising a visualization of a supply chain network and a first cuboid, the first cuboid comprising one or more adjustable display dimensions corresponding to one or more key process indicators and one or more cubelets divided along at least one of the one or more adjustable display dimensions;
displaying, by a mixed-reality display device comprising a display and one or more sensors, the mixed-reality object on the display, wherein the mixed-reality object further comprises visual and aural indicators;
navigating, by the mixed-reality display device, the visualization of the supply chain network;

displaying, by the mixed-reality display device, an alert associated with a detection of an exception or problem condition associated with the one or more key process indicators;

interacting, by the mixed-reality display device, with the visualization of the supply chain network to modify the supply chain network; and in response to the interaction with the visualization of the supply chain network, modifying, by the mixed-reality display device, one or more supply chain processes.

9. The computer-implemented method of claim 8, further comprising:

displaying and locating, by the mixed-reality display device, one or more visual elements overlaid on one or more real world scenes based, at least in part, on a calculated visual field of a user.

10. The computer-implemented method of claim 8, wherein the one or more sensors of the mixed-reality display device comprise one or more of: a gaze tracking sensor, a hand gesture sensor, and a head orientation sensor.

11. The computer-implemented method of claim 8, further comprising:

modifying, by the mixed-reality display device, the one or more supply chain processes using one or more of: speech, eye movement, hand gesture and spoken instructions.

12. The computer-implemented method of claim 8, wherein the mixed-reality display device further comprises a first display to display an image into a user's left eye and a second display to display an image into the user's right eye.

13. The computer-implemented method of claim 8, further comprising:

altering, by the mixed-reality display device, an appearance and a placement of one or more visual elements of the visualization of the supply chain network based, at least in part, on movement of one or more objects within a visual feed of a camera.

14. The computer-implemented method of claim 8, wherein the one or more supply chain processes comprise one or more of:

demand planning, supply and distribution planning, inventory management, allocation planning and order fulfillment.

15. A non-transitory computer-readable storage medium embodied with software, the software when executed configured to:

generate a mixed-reality object comprising a visualization of a supply chain network and a first cuboid, the first cuboid comprising one or more adjustable display dimensions corresponding to one or more key process indicators (KPIs) and one or more cubelets divided along at least one of the one or more adjustable display dimensions;

display, by a mixed-reality display device comprising a display and one or more sensors, the mixed-reality object on the display, wherein the mixed-reality object further comprises visual and aural indicators;

navigate, by the mixed-reality display device, the visualization of the supply chain network;

display, by the mixed-reality display device, an alert associated with a detection of an exception or problem condition associated with the one or more key process indicators;

interact, by the mixed-reality display device, with the visualization of the supply chain network to modify the supply chain network; and in response to the interaction with the visualization of the supply chain network, modify one or more supply chain processes.

16. The non-transitory computer-readable storage medium of claim 15, wherein the software when executed is further configured to:

display and locate, by the mixed-reality display device, one or more visual elements overlaid on one or more real world scenes based, at least in part, on a calculated visual field of a user.

17. The non-transitory computer-readable storage medium of claim 15, wherein the one or more sensors of the mixed-reality display device comprise one or more of: a gaze tracking sensor, a hand gesture sensor, and a head orientation sensor.

18. The non-transitory computer-readable storage medium of claim 15, wherein the software when executed is further configured to:

modify the one or more supply chain processes using one or more of: speech, eye movement, hand gesture and spoken instructions.

19. The non-transitory computer-readable storage medium of claim 15, wherein the mixed-reality display device further comprises a first display to display an image into a user's left eye and a second display to display an image into the user's right eye.

20. The non-transitory computer-readable storage medium of claim 15, wherein the software when executed is further configured to:

alter an appearance and a placement of one or more visual elements of the visualization of the supply chain network based, at least in part, on movement of one or more objects within a visual feed of a camera.

* * * * *